(12) United States Patent
Sultania (10) Patent No.: US 9,984,187 B1
(45) Date of Patent: May 29, 2018

(54) SWITCHING ACTIVITY ESTIMATION FOR A MULTI-CLOCK DOMAIN FOR POWER CONSUMPTION ESTIMATION

(71) Applicant: Xilinx, Inc., San Jose, CA (US)

(72) Inventor: Anup K. Sultania, Sunnyvale, CA (US)

(73) Assignee: XILINX, INC., San Jose, CA (US)

( * ) Notice: Subject to any disclaimer, the term of this patent is extended or adjusted under 35 U.S.C. 154(b) by 1080 days.

(21) Appl. No.: 14/253,391

(22) Filed: Apr. 15, 2014

(51) Int. Cl.
  *G06F 17/50* (2006.01)

(52) U.S. Cl.
  CPC ................. *G06F 17/5036* (2013.01)

(58) Field of Classification Search
  CPC .................................. G06F 17/5036
  USPC ............................................. 703/14
  See application file for complete search history.

(56) References Cited

U.S. PATENT DOCUMENTS

2002/0023239 A1\* 2/2002 Nomura .................. H03L 7/183
                                                                    713/500

OTHER PUBLICATIONS

Najm, Farid N., "Transition Density: A New Measure of Activity in Digital Circuits," *IEEE Transactions on Computer-Aided Design of Integrated Circuits and Systems*, Feb. 1993, pp. 310-323, vol. 12, No. 2, IEEE, Piscataway, New Jersey, USA.

Najm, Farid N. et al., edited by Andrew Yang and Karti Mayaram, "Estimating Power Dissipation in VLSI Circuits," *IEEE Circuits and Devices Magazine*, Jul. 1994, pp. 11-19, IEEE, Piscataway, New Jersey, USA.

Wu, Qing et al., "A Note on the Relationship Between Signal Probability and Switching Activity," *Proc. of the ASP-DAC '97 Asia and South Pacific Design Automation Conference*, Jan. 28, 1997, pp. 117-120, IEEE, Piscataway, New Jersey, USA.

\* cited by examiner

*Primary Examiner* — Saif A Alhija
(74) *Attorney, Agent, or Firm* — W. Eric Webostad (57) ABSTRACT

A method relating generally to simulation is disclosed. In such a method, a first signal input and a second signal input are provided to a multiple clock domain object. The first signal input is for a first clock domain. The second signal input is for a second clock domain. The first clock domain is associated with a first frequency, and the second clock domain is associated with a second frequency different from the first frequency. The first signal input and the second signal input are converted to a common multiple clock frequency. A signal output is obtained from the multiple clock domain object responsive to the common multiple clock frequency. Switching activity is estimated for the multiple clock domain object. An output estimate associated with the switching activity estimated is output.

20 Claims, 9 Drawing Sheets

SWITCHING ACTIVITY ESTIMATION FOR A MULTI-CLOCK DOMAIN FOR POWER CONSUMPTION ESTIMATION

TECHNICAL FIELD

The following description relates to integrated circuit devices ("ICs"). More particularly, the following description relates to switching activity estimation for a multi-clock domain for power consumption estimation for an IC.

BACKGROUND

ICs have become more "dense" over time, i.e., more logic features have been implemented in an IC of a given size. Therefore, power consumption has become an increasingly more significant issue. Hence, it is desirable and useful to provide a more accurate estimation of power consumption of a circuit design prior to realization as an IC.

SUMMARY

A method relates generally to simulation. In such a method, a first signal input and a second signal input are provided to a multiple clock domain object. The first signal input is for a first clock domain. The second signal input is for a second clock domain. The first clock domain is associated with a first frequency, and the second clock domain is associated with a second frequency different from the first frequency. The first signal input and the second signal input are converted to a common multiple clock frequency. A signal output is obtained from the multiple clock domain object responsive to the common multiple clock frequency. Switching activity is estimated for the multiple clock domain object for operation based on the common multiple clock frequency. An output estimate associated with the switching activity estimated is output.

Another method relates generally to simulation. In such a method, a circuit design is obtained having a multiple clock domain block. A first signal input and a second signal input are provided to the multiple clock domain block. The first signal input and the second signal input respectively have a first clock frequency and a second clock frequency. A first signal rate of the first signal input is converted to a first toggle rate. A second signal rate of the second signal input is converted to a second toggle rate. The first toggle rate and the second toggle rate are normalized to a common multiple clock frequency of the first clock frequency and the second clock frequency. The first toggle rate and the second toggle rate are propagated through the multiple clock domain block to provide a signal output. Switching activity of the multiple clock domain block is estimated in response to the propagating to provide the signal output. A power consumption estimate is determined for the switching activity estimated. The power consumption estimate is output.

A computer aided design program recorded in a non-transitory machine-readable recording medium which is capable of being processed by an information handling system for causing the information handling system to perform a method, the method relates generally to simulation. In such a method, a circuit design having a multiple clock domain blocks coupled to one another is obtained. First signal inputs are provided to a first portion of the multiple clock domain blocks of the multiple clock domain blocks. The first signal inputs respectively have clock frequencies different from one another. Signal rates of the first signal inputs are converted to corresponding toggle rates. The toggle rates are normalized to corresponding common multiple clock frequencies respectively associated with the first portion of the multiple clock domain blocks. The toggle rates are propagated through the first portion of the multiple clock domain blocks corresponding thereto to provide signal outputs from the first portion of the multiple clock domain blocks. Switching activity of the first portion of the multiple clock domain blocks is estimated in response to the propagating to provide the signal outputs. A power consumption estimate is determined for the switching activity estimated for the first portion of the multiple clock domain blocks. The power consumption estimate is output.

BRIEF DESCRIPTION OF THE DRAWINGS

Accompanying drawings show exemplary apparatus(es) and/or method(s). However, the accompanying drawings should not be taken to limit the scope of the claims, but are for explanation and understanding only.

DETAILED DESCRIPTION

In the following description, numerous specific details are set forth to provide a more thorough description of the specific examples described herein. It should be apparent, however, to one skilled in the art, that one or more other examples and/or variations of these examples may be practiced without all the specific details given below. In other instances, well known features have not been described in detail so as not to obscure the description of the examples herein. For ease of illustration, the same number labels are used in different diagrams to refer to the same items; however, in alternative examples the items may be different.

Before describing the examples illustratively depicted in the several figures, a general introduction is provided to further understanding.

Power estimation of a circuit design generally refers to estimating average power dissipation, which is different from worst case peak power estimation. To compute or otherwise determine average power estimation for power consumption of a circuit design, an estimation of switching activity information for each circuit or net of such a circuit design may be used. Switching activity information may be based on probability of a signal to be at a logic 1 state, which likewise defines probability of a signal to be at a logic 0 state. Additionally, there may be times when a signal is changing from a logic 0 to a logic 1 state, and vice versa. Furthermore, in some instances two or more signals input to a same logic block, which may include one or more logic gates, and may transition at a same time or within a same window of time.

Signal rate of a signal generally refers to a total number of logic 0 to logic 1 and logic 1 to logic 0 transitions per unit of time which is larger than a single period of a clock frequency associated with such signal rate. Toggle rate of a signal generally refers to a total number of logic 0 to logic 1 and logic 1 to logic 0 transitions per clock cycle of a clock frequency associated with such toggle rate. Though the term "clock" is used herein, such term may include a free running clock, a gated clock, or other periodic signal used to periodically control passing of data or other information.

For an input signal N, toggle rate, Psw, is related to signal rate, S, by dividing signal rate, S, by frequency of an associated clock signal, Fclk, namely Psw=S/Fclk. Accordingly, an input signal N is controlled, such as synchronized for example, at a frequency Fclk. As described below in additional detail, estimation of switching activity for a multiple clock domain, such as two or more input signals of different frequencies, is provided from simulation. Such switching activity estimation may be obtained from a common multiple frequency of such input signals in order to more accurately estimate switching activity of an object representing a multiple clock domain. Thus, generally propagation of switch activity may be estimated to provide switching activity estimates, which estimates may be converted to a power consumption estimate for output.

With the above general understanding borne in mind, various configurations for power consumption estimation are generally described below.

Figure 1:
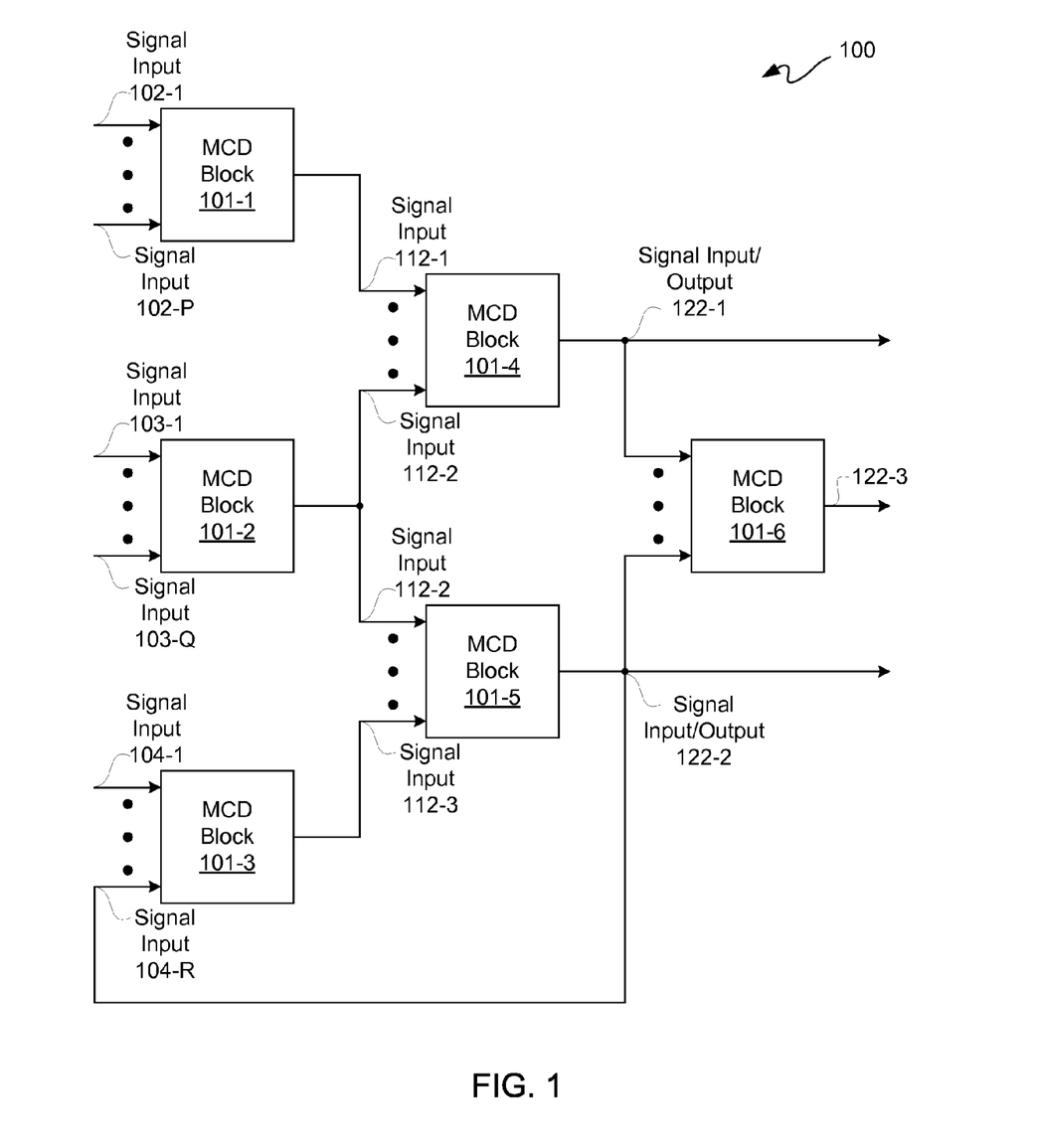
FIG. 1 is a block diagram depicting an exemplary circuit design having multiple clock domain blocks ("MCDs").

FIG. 1 is a block diagram depicting an exemplary circuit design 100 having multiple clock domain blocks ("MCDs") 101-1 through 101-6 (collectively and singly "101"). Even though six multiple clock domain blocks 101 are illustratively depicted fewer or more multiple clock domain blocks may be present in a circuit design 100. Furthermore, even though only multiple clock domain blocks 101 are illustratively depicted for purposes of clarity, a circuit design 100 may have a mix of single clock domain blocks and at least one multiple clock domain block 101. Circuit design 100 may be a virtual representation of a circuit, such as may be processed by a computer aided design ("CAD") tool.

In an example, MCDs 101 may be thought of as objects or classes, and signal inputs may be input strings processed by MCDs 101 to provide output signals, which may be represented as output strings. Along those lines, such input and output strings may be thought of as arguments, parameters, variables, or signals, which may be fixed, static, or variable.

Signal inputs 102-1 through 102-P (singly and collectively "102"), 103-1 through 103-Q (singly and collectively "103"), and 104-1 through 104-R (singly and collectively "104") are respectively input to MCDs 101-1 through 101-3 for P, Q, and R integers greater than one. For purposes of clarity by way of example and not limitation, assume P is equal to two. Thus, for example, a first input signal 102-1 and a second input signal 102-2 provided to MCD 101-1 may be obtained by a software and/or hardware tool, such as described below in additional detail, where input signals 102-1 and 102-2 respectively have a first clock frequency and a second clock frequency as part of their parametric definition, and such first and second frequencies may be different from one another. Furthermore, such parametric definition may include a first signal rate and a second signal rate respectively for input signals 102-1 and 102-2, and such first and second signal rates may be different from one another.

Accordingly, signal inputs 102, 103, and 104 may include at least one or more different clock domains, or may include one or more same clock domains. Furthermore, signal inputs 102, 103, and 104 may include same and/or different signal rates. However, for purposes of clarity by way of example and not limitation, it is assumed that different clock domains are represented by each set of signal inputs 102, 103, and 104, and furthermore, each set of signal inputs 102, 103, and 104 has different signal rates.

Outputs of MCDs 101 may be provided as signal inputs to a next logic level or processing stage of a circuit design 100. In this example, MCDs 101-1 through 101-3 provide outputs respectively as signal inputs 112-1 through 112-3. Signal inputs 112-1 through 112-3 may be propagated downstream, where such signal inputs 112-1 through 112-3 may be vectorless signal inputs. In this example, signal inputs 112-1 and 112-2 are input to MCD 101-4, and signal inputs 112-3 and 112-2 are input to MCD 101-5. Furthermore, outputs of MCDs 101-4 and 101-5 may be provided as signal inputs and/or signal outputs 122-1 and 122-2, respectively. In this example, signal inputs 122-1 and 122-2 are input to MCD 101-6 to provide a signal output 122-3. Furthermore, signal outputs 122-1 through 122-3 are provided as outputs of circuit design 100. Additionally, in this example, a signal input 122-2 is provided as a feedback signal input to MCD 101-3.

Accordingly, it should be appreciated that in a circuit design there are many possible configurations of MCDs and signaling associated therewith. Furthermore, a level or stage may have signaling representing different clock domains. In this example, signal inputs 112-1 and 112-2 are for different clock domains, and signal inputs 112-3 and 112-2 are for different clock domains. Furthermore, signal inputs 122-1 and 122-2 are for different clock domains. To virtually or simulatively propagate signals downstream in a circuit design, a resolution of differences in clock domains of signal inputs may be determined, as described herein, to provide an accurate representation of such downstream signaling. Along those lines, signals may go in and out of phase, switch at different or same times, or other behavior for which generation of accurate switching information of MCDs may be used, as described herein. Furthermore, such accurate switching information of MCDs may lend itself to provide accurate representation of downstream signaling, or more generally a more accurate representation of operation of a circuit design.

For example, continuing the above example of signal inputs 102-1 and 102-2, first and second signal rates respectively thereof may be converted to respective first and second toggle rates. Such first and second toggle rates may be normalized to a common multiple clock frequency of first and second clock frequencies respectively of signal inputs 102-1 and 102-2, which frequencies are different from one another. Such first and second toggle rates may be used to generate switching information of MCD 101-1, namely simulate or model switching activity of MCD 101-1 for processing such signal inputs 102-1 and 102-2 through MCD 101-1 to provide an output signal 112-1, which may be used as an input signal to a next logic level or processing stage. There may be a plurality of common multiple clock frequencies respectively associated with MCDs 101. To propagate MCD output signals downstream, such output signals may be converted from corresponding toggle rate domains associated with such corresponding plurality of common multiple clock frequencies to respective signal rate domains with associated frequencies of operation, as described below in additional detail.

In accordance with the above-description, generation of switching information may be used to estimate power consumption of a circuit design. A common multiple frequency may be determined for each MCD. Thus, for example, MCD 101-1 and MCD 101-2 may have corresponding common multiple frequencies determined therefor for frequencies associated with sets of signal inputs 102 and 103. Simulated switching activity of each MCD 101 may be used to provide an estimate of power consumption of each such MCD in response to propagating signal inputs to provide at least one signal output from a circuit design. Such power consumption estimates of each MCD in a circuit design may be summed or combined to determine a power consumption estimate for such switching activity estimated for a circuit design, and such power consumption estimate may be output from a software tool, such as for example a CAD tool used to estimate power for circuit design 100. Furthermore, power consumption estimates may be provided for each MCD 101 or a subset of one or more MCDs 101, so as to provide a more granular understanding of power consumption of a circuit design 100.

Again, toggle rate Psw of a signal input may be determined as being equal to signal rate S of such a signal input divided by a clock frequency Fclk of such signal input. Toggle rates of multiple signal inputs may be correspondingly determined. For a set of signal inputs provided to an MCD 101, namely where two or more frequencies of such signal inputs are different from one another, such toggle rates may be normalized. Along those lines, a common multiple clock frequency may be determined. For purposes of clarity by way of example and not limitation, it shall be assumed that such common multiple clock frequency is a least common multiple ("LCM") clock frequency for a set of signal inputs. However, a common multiple clock frequency in a range k of an LCM clock frequency may be used, where k may be less than, equal to, or greater than one, as may vary from application to application. For a normalized toggle rate Psw', such normalized toggle rate may be set to equal a toggle rate Psw determined for a signal input multiplied by a ratio of a clock frequency Fclk for such signal input divided by an LCM clock frequency, or kLCM_clk. For purposes of clarity by way of example and not limitation, k is assumed to be 1 in the following description. While k may deviate from 1 to some degree without appreciably affecting accuracy of a switching activity estimate, large deviations from k equal to 1 may result in significant loss of accuracy in a switching activity estimate. After a switching activity estimate is determined for an MCD, such normalized toggle rate Psw' may be converted to a normalized signal rate S', namely a signal rate for a signal output in an LCM clock frequency domain.

With the above general description borne in mind, more particular examples are provided for purposes of clarity by way of example and not limitation.

Figure 2:
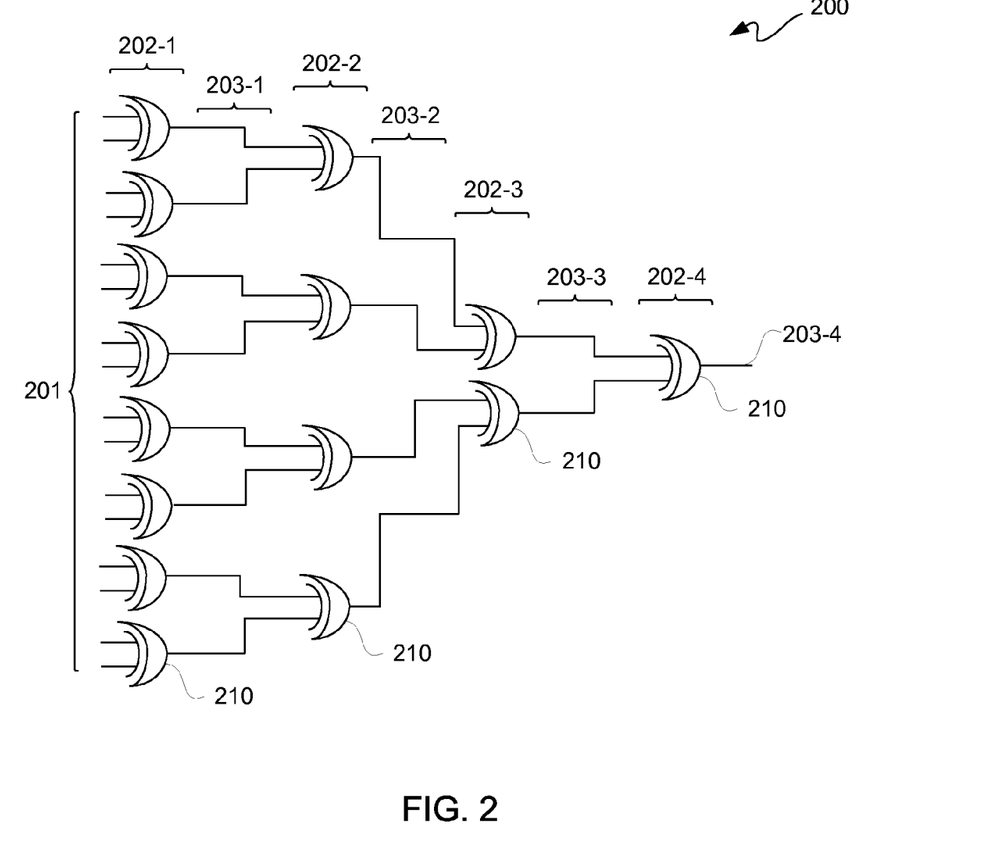
FIG. 2 is a schematic diagram depicting an exemplary exclusive-OR ("XOR") tree.

FIG. 2 is a schematic diagram depicting an exemplary exclusive-OR ("XOR") tree 200. XOR tree 200 is just one of many possible examples of a circuit design or a block of a circuit design, such as of circuit design 100 of FIG. 1. Accordingly, even though a particular example of combinatorial logic, as well as a particular logic gate, is illustratively depicted, any combination of one or more types of logic gates forming a combination logic block or blocks may be represented as a circuit design having one or more MCDs. Along those lines, XOR tree 200 may represent a single instance of an MCD 101 or multiple instances of MCDs 101 of FIG. 1. For purposes of clarity by way of example and not limitation, it shall be assumed that XOR tree 200 represents multiple instances of MCDs, where each logic level of logic levels 202-1 through 202-4 is a separate MCD.

Along the above lines, signal inputs 201 may represent multiple clock domains. Though only two-input XOR logic gates 210 are illustratively depicted for each of logic level of logic levels 202-1 through 202-4 for clarity, it should be understood that in addition to having logic gates other than or including XOR logic gates 210, more than two-input logic gates may be used. Furthermore, fewer or more than the number of XOR logic gates 210 illustratively depicted may be used.

Each XOR logic gate 210 may be provided with a first signal input and a second signal input, and these first and second signal inputs may represent different clock domains, namely clock domains of different frequencies. For clarification, different clock domains does not include different clock signals of a same frequency which may be generated from a same or different clock signal sources and which may be in or out of phase with respect to one another. Thus, by different clock domains, it is generally meant that two or more input signals are controlled by different clock signal frequencies, which may be in phase, out of phase, or drift in and out of phase with respect to one another. Again, clock signals are used as previously described herein.

Signal levels or signal stages 203-1 through 203-4, which may be output signal levels or stages of corresponding logic levels or stages 202-1 through 202-4, may or may not be of a same clock domain. For a same MCD for XOR tree 200, such signal levels or stages 203-1 through 203-4 may be of a same clock domain. Optionally, register stages may be added to control flow of data or other information responsive to clock signaling, as described below in additional detail.

Figure 3A:
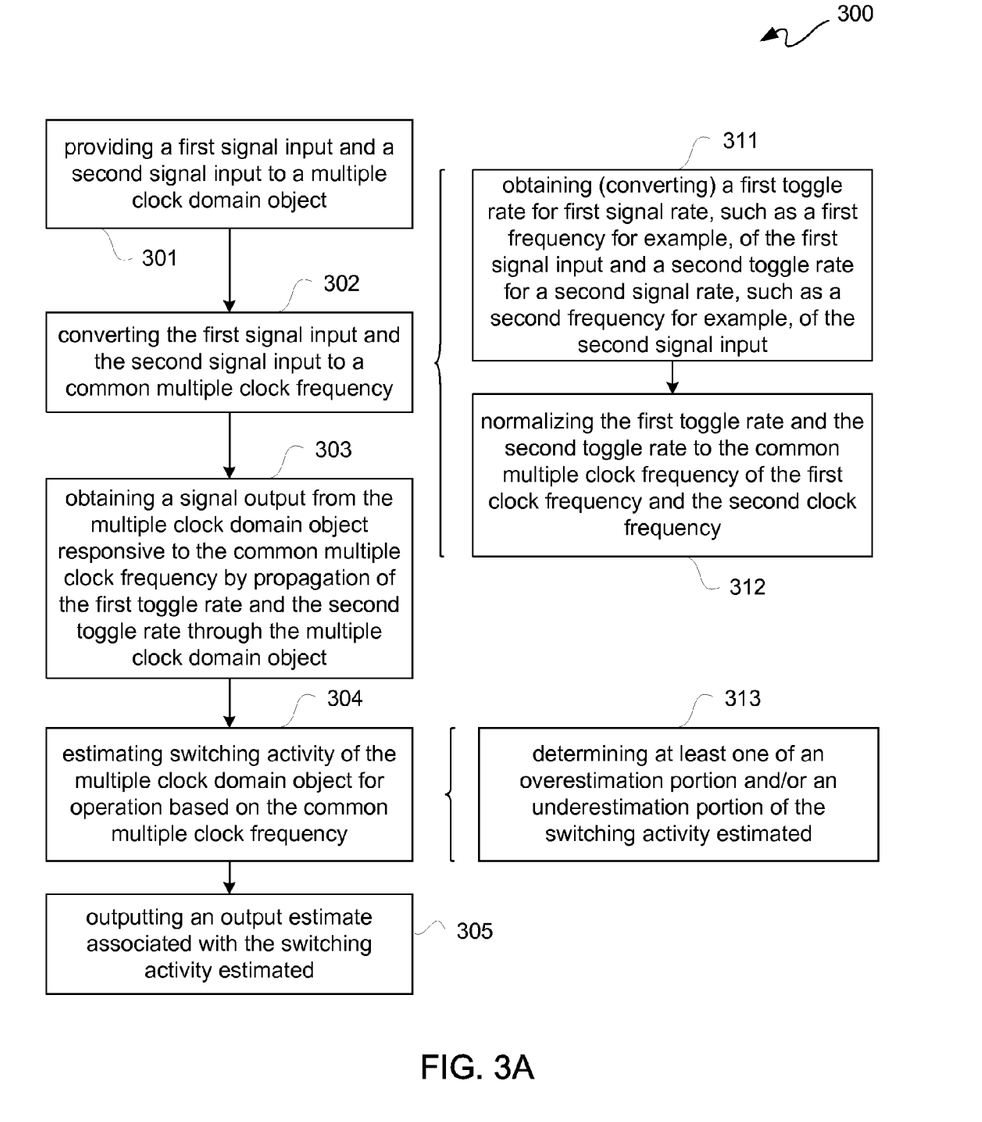
FIG. 3A is a flow diagram depicting an exemplary power consumption estimation flow.
Figure 4:
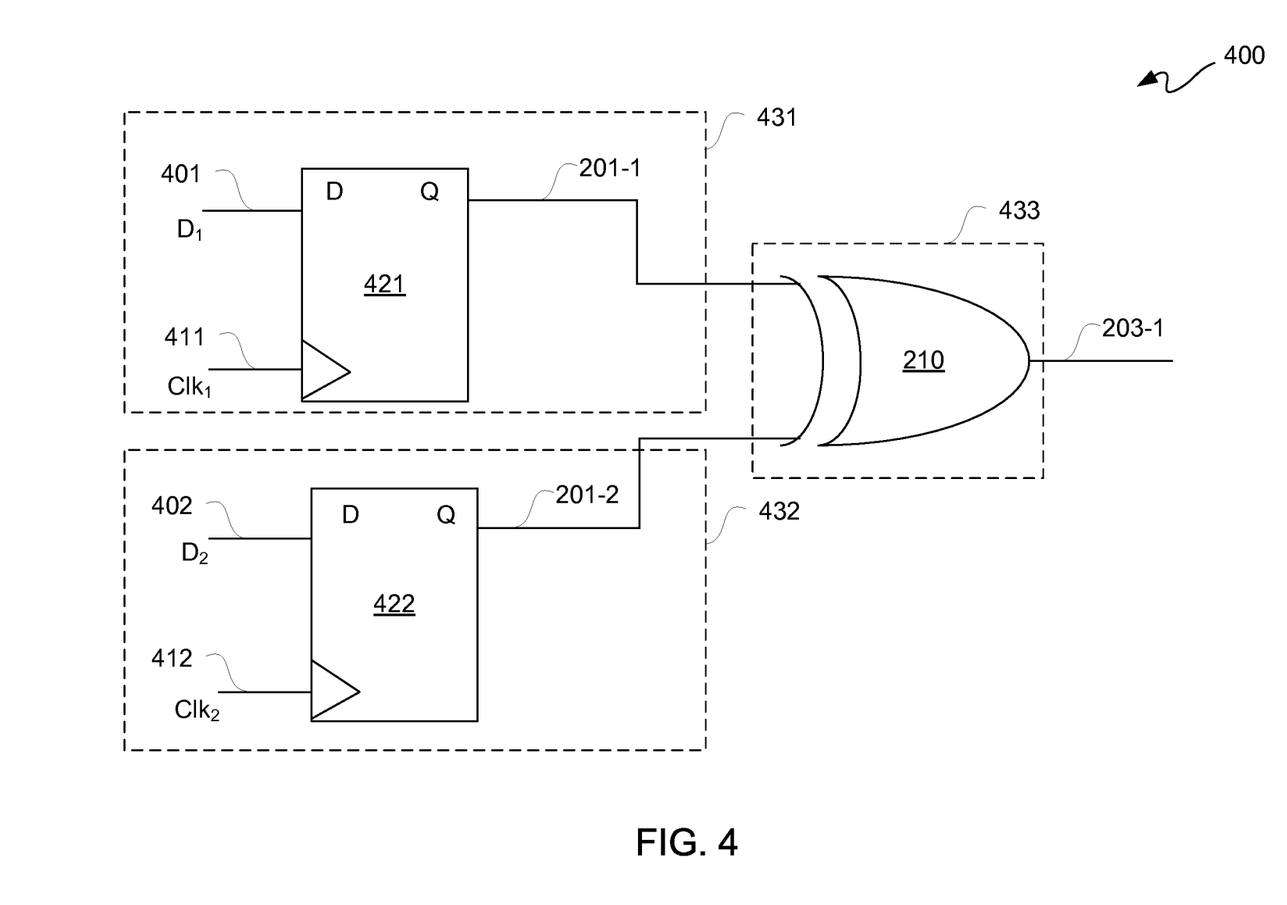
FIG. 4 is a schematic diagram depicting an exemplary MCD, which may be an instance of an MCD of FIG. 1.

FIG. 3A is a flow diagram depicting an exemplary switching activity estimation flow 300. At 301, a first signal input and a second signal input are provided for input to an MCD, such as an MCD 101, where such signal inputs are from different clock domains. For purposes of clarity by way of example and not limitation, it shall be assumed that an MCD includes a logic gate. Along those lines, FIG. 4 is a schematic diagram depicting an exemplary MCD 400, which may be an instance of an MCD 101. Thus, for purposes of clarity by way of example and not limitation, switching activity estimation flow 300 of FIG. 3A is further described with simultaneous reference to MCD 400 of FIG. 4.

Prior to inputting first signal input 201-1 and second signal input 201-2 to XOR logic gate 210 to obtain output signal 203-1, first signal input 201-1 and second signal input 201-2 may be respectively obtained from outputs of registers 421 and 422. A signal input 401 may be a data input provided to register 421, and register 421 may be clocked responsive to an input clock signal 411. Likewise, a signal input 402 may be a data input provided to register 422, and register 422 may be clocked responsive to an input clock signal 412. Clock signals 411 and 412 in this example are of different clock domains, and so they have different frequencies. Accordingly, register 421 may be considered to be in a first clock domain 431, and register 422 may be considered to be in a second clock domain 432, and XOR logic gate 210 may be considered to be in a multiple clock domain 433. However, for purposes of clarity by way of example and not limitation, clock domains 431 through 433 are considered to be one multiple clock domain.

For a virtual realization of an MCD 101 for CAD, MCD 400 may not be actual hardware circuitry as illustratively depicted, but may be objects or other software representations of those devices. Thus, it may be assumed that all signals and hardware resources illustratively depicted in FIG. 4 are not the actual signals and hardware but rather are simulations of corresponding signals and hardware.

At 302, a first signal input 201-1 and a second signal input 202-2 may be converted to a common multiple clock frequency of clock frequencies of clock signals 411 and 412. Such common multiple clock frequency may be the least common multiple frequency of a first frequency associated with first input signal 201-1, namely a frequency of clock signal 411, and a second frequency associated with second input signal 201-2, namely a frequency of clock signal 412.

Conversion at 302 may include operations at 311 and 312. At 311, a toggle rate for a first signal rate, such as a first frequency for example, of first signal input 201-1 and a toggle rate for a second signal rate, such as a second frequency for example, of second signal input 201-2 may be obtained. Each toggle rate may be respectively obtained from a signal rate of first signal input 201-1 and a signal rate of second signal input 201-2, as well as respectively from frequencies of clock signals 411 and 412. These clock frequencies may be those of clock signals 411 and 412, as previously described, and such clock frequencies may be parameters of a simulation. Such parameters, whether clock frequencies and/or signal rates, may be generated based on a circuit design, obtained default values, and/or provided by a user.

At 312, such toggle rate of signal input 201-1 and such toggle rate of signal input 201-2 may be normalized to a common multiple clock frequency, which may be the least common multiple of clock frequencies of clock signals 411 and 412. Again, for an input signal N, toggle rate, Psw, is related to signal rate, S, by dividing signal rate, S, by frequency of an associated clock signal, Fclk, namely Psw=S/Fclk. Accordingly, input signal N is controlled, such as synchronized for example, at a frequency Fclk. A normalized toggle rate Psw' may thus equal a determined toggle rate for a signal rate and a clock frequency multiplied by a ratio of such clock frequency to the least common multiple clock frequency, or Psw'=Psw (Fclk/LCM_clk). Again, a least common multiple frequency may be an LCM frequency of a first frequency and a second frequency respectively of a first signal input 201-1 and a second signal input 201-2.

At 303, a signal output 203-1 may be obtained from a multiple clock domain object, such as a logic gate object such as an XOR logic gate 210 for example, responsive to a common multiple clock frequency. Such obtaining may be propagation of such first and second toggle rates through such a multiple clock domain object. A logic gate object 210 is referred to below to indicate any logic gate or combination of logic gates, namely any combinatorial logic. Signal inputs 201-1 and 201-2 having been normalized to a common multiple clock frequency, such as an LCM clock frequency for example, so signal output 203-1 is of a clock domain for such a common multiple clock frequency. Because all signal inputs to a logic gate object are effectively converted to a same clock domain, a signal output is in such same clock domain.

At 304, switching activity of a logic gate object 210 may be estimated for operation based on a common multiple clock frequency as a clock domain for a multiple clock domain object such logic gate object 210 for example. Such switching activity estimated may include determining at least one of an overestimation portion and/or an underestimation portion at 313. Such overestimation and underestimation portions may be used to enhance accuracy of a power estimation. Along those lines, in estimating switching activity propagation, switching activity of one logic block in a propagation chain may be overestimated, while switching activity of another logic block in such propagation chain may be underestimated. Such switch activity over and/or under estimates may be converted to power consumption estimates, where power is additive. Along those lines, estimates of such switching activity portions when converted to estimates of power consumption may in effect cancel or average one another out at least in substantial part to provide for enhanced accuracy in such power estimate. At 305, switching activity estimated at 304 may be provided as an output estimate, or an output estimate associated with such switching activity estimated may be output.

Figure 3B:
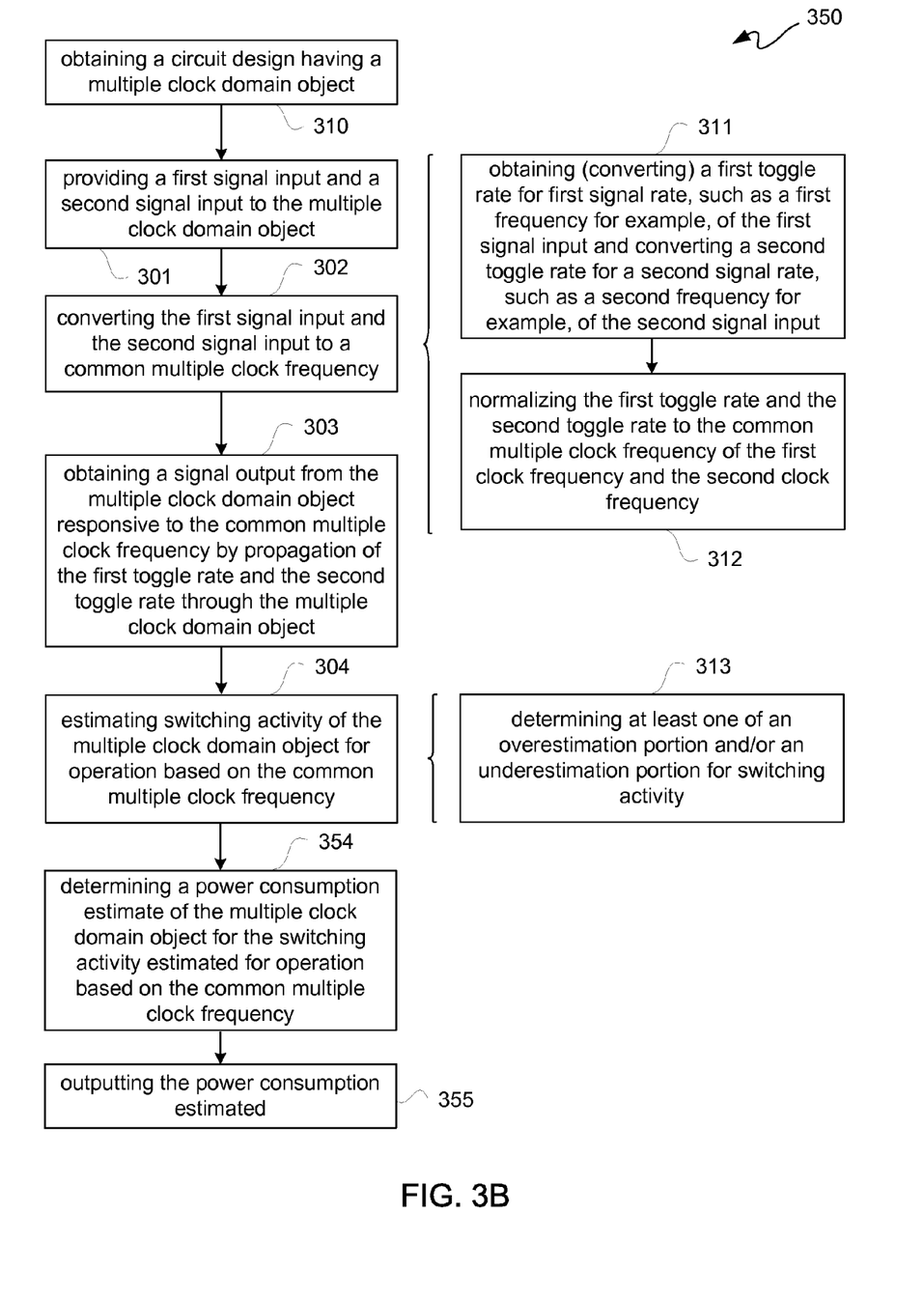
FIG. 3B is a flow diagram depicting another exemplary power consumption estimation flow.

Switching activity may be associated with power consumption and/or reliability of a logic gate. With respect to the former, FIG. 3B is a flow diagram depicting an exemplary power consumption estimation flow 350. At 310, a circuit design, such as in FIG. 1 for example, is obtained, where such circuit design has at least one MCD. Thereafter, power consumption estimation flow 350 is the same as switching activity estimation flow 300 of FIG. 3A with respect to operations 301, 302, 303, 304, 311, 312, and 313, and operation 305 of switching activity estimation flow 300 of FIG. 3A is replaced with operations 354 and 355 in power consumption estimation flow 350. Accordingly, the above-description in common as between FIGS. 3A and 3B is not repeated.

At 354, power consumption of a logic gate object 210 may be estimated for operation based on switching activity estimated for sampling with a common multiple clock frequency as a clock domain for a multiple clock domain object, such logic gate object 210 for example. Such switching activity estimated for a determination of power consumption estimate at 354 may include determining at least one of an overestimation portion and/or an underestimation portion at 313. For example, one MCD might overestimate, another MCD may underestimate. Since power is additive, there may be a net cancellation effect and hence better accuracy. Along those lines, a better distribution of over estimates and under estimates may be provided. Hence, such a cancellation effect may lead to better accuracy. Estimates of such switching activity portions when converted to estimates of power consumption may in effect average or cancel one another out at least in substantial part to provide for enhanced accuracy in such estimate. At 355; power consumption estimated at 354 may be output.

Figure 5:
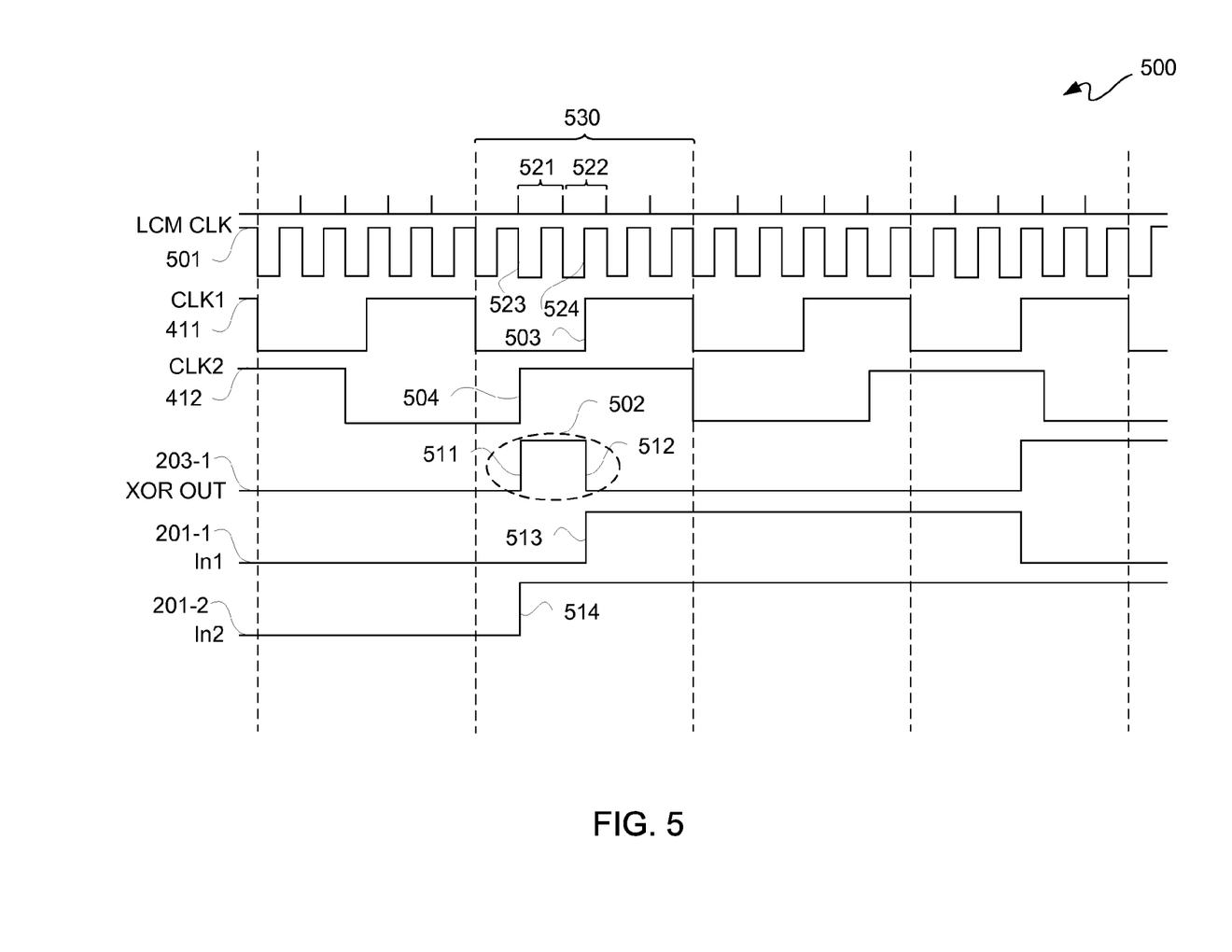
FIG. 5 is a signal diagram depicting an exemplary signal propagation for the MCD of FIG. 4.
Figure 6:
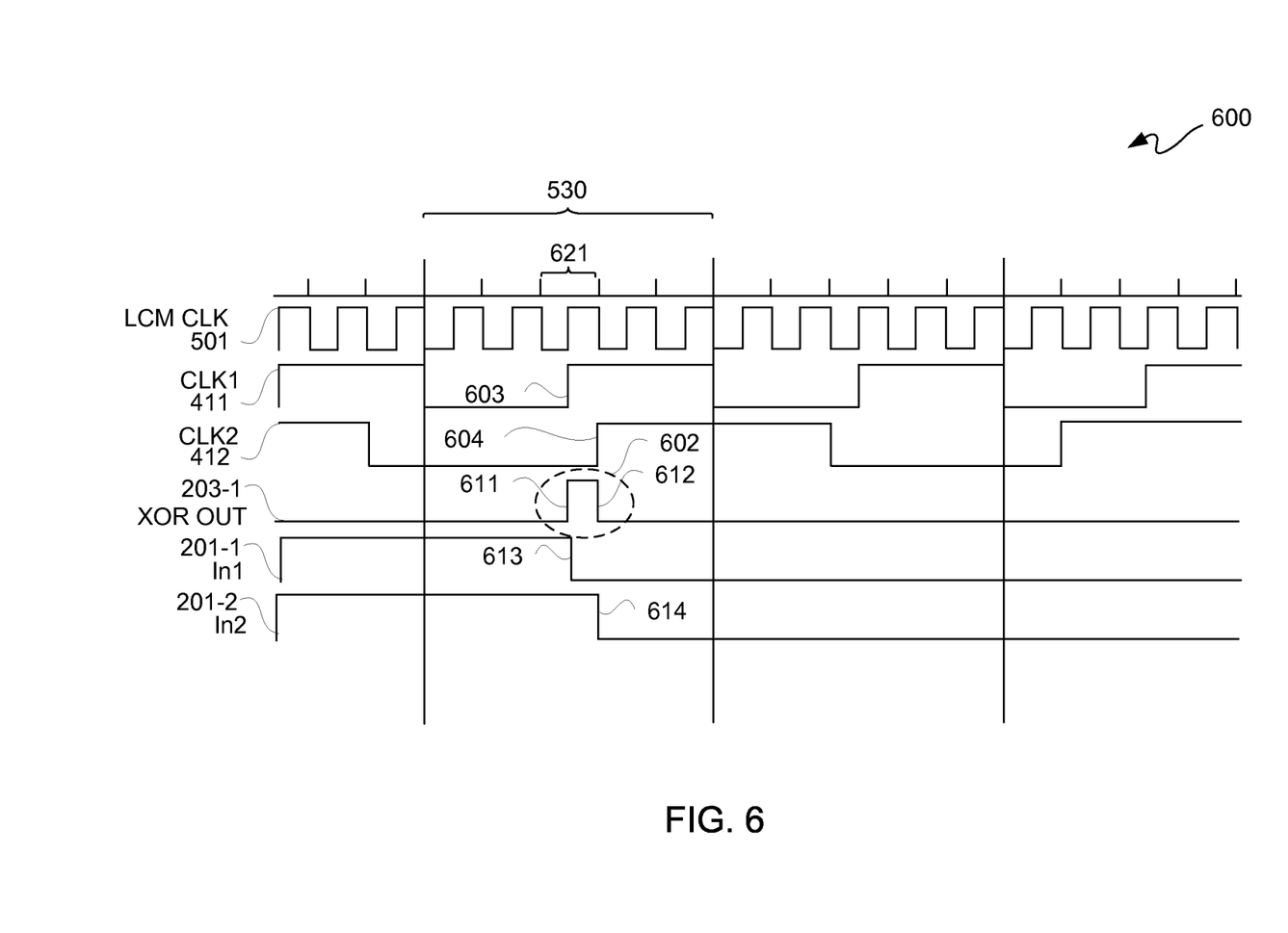
FIG. 6 is a signal diagram depicting another exemplary signal propagation for the MCD of FIG. 4.

FIG. 5 is a signal diagram depicting an exemplary signal propagation 500 for MCD 400 of FIG. 4. FIG. 6 is a signal diagram depicting an exemplary signal propagation 600 for MCD 400 of FIG. 4.

With reference to FIG. 5, an LCM clock signal 501 is obtained from an LCM of frequencies of clock signals 411 and 412. In this example, frequency of LCM clock signal 501 is higher in frequency than either of the frequencies of clock signals 411 and 412. However, in another instance, an LCM frequency may be equal to either of the frequencies of clock signals 411 and 412.

In this example, a rising edge 511 of signal output 203-1 corresponds to a leading edge 504 of clock signal 412 as well as a rising edge 514 of signal input 201-2. Also, a falling edge 512 of signal output 203-1 corresponds to a leading edge 503 of clock signal 411 as well as a falling edge 512 of signal input 201-1. Rising edge 514 occurs within a period 521 of LCM clock signal 501, and for such period 521, an edge 523 of LCM clock signal 501 corresponds to leading edge 504. Rising edge 513 occurs within a period 522 of LCM clock signal 501, and for such period 522, an edge 524 of LCM clock signal 501 corresponds to leading edge 503. In this example, there is a single change of state for each period: (1) rising edge 514 of signal input 201-2 within period 521 for forming a rising edge 511 portion of an output pulse 502 of signal output 203-1; and (2) rising edge 513 of signal input 201-1 within period 522 for forming a falling edge 512 portion of output pulse 502 of signal output 203-1. In this example, periods 521 and 522 are next to one another in time; however, in other examples the above-identified changes in state of signal inputs 201-1 and 201-2 may be spaced further apart in time.

Thus, it should be appreciated that both edges 511 and 512 may be sampled for purposes of estimating power consumption associated with such transitions using an LCM clock signal 501. If sampling was based on normalization to a higher one of the frequencies of clock signals 411 and 412, which in this example is the frequency of clock signal 411, then such sampling would miss one of edges 511 and 512 as they both occur within a same period 530 of clock signal 411. Furthermore, if frequencies substantially higher than that of LCM clock signal 501 were used, then glitches, such as due to simultaneous switching events of data inputs to a logic gate for example, may be sampled, which may lead to a significant overestimation bias or portion of a power consumption estimate. An LCM clock signal 501 may sample some, though less, of such glitches than a substantially higher frequency clock signal. Thus, LCM clock signal 501 may have some, though substantially less, overestimation than a significantly higher frequency clock signal.

With reference to FIG. 6, rising edge 611 of pulse 602 on signal output 203-1 corresponds to falling edge 613 of signal input 201-1, and falling edge 612 of pulse 602 on signal output 203-1 corresponds to falling edge 614 of signal input 201-2. Falling edges 613 and 614 respectively correspond to rising edge 603 of clock signal 411 and rising edge 604 of clock signal 412. As both edges 611 and 612 occur with a same period 621 of LCM clock signal 501, only one, and not both of such edges, may be sampled, leading to an underestimation or bias of a power consumption estimate.

Sampling based on an LCM clock signal 501 may include both an overestimation portion and an underestimation portion. However, such over- and under-estimation portions may effectively cancel one another out to at least some extent leaving either a slight overestimation bias or a slight underestimation bias, or neither of these for a complete cancellation. In other words, for CAD, a natural balancing of switching events during signal propagation may result, where overestimation on some upstream logic may be balanced out by underestimation on some subsequent downstream logic. This balancing may provide a more accurate estimate of power consumption. As an estimate of power consumption may be based on a law of averages, this balancing out of over- and underestimations may provide a more accurate overall estimate of power consumption of a circuit design simulated by CAD by enhanced accuracy of switching activity propagation across combination logic in one or more multi-clock domains.

Even though the above description was in terms of power estimation, switching activity may likewise be linked to reliability, and thus a more accurate estimate of power consumption of an MCD may provide a more accurate reliability metric. Furthermore, having a more accurate understanding of power consumption of an MCD may lead to a more efficient design resulting in lower power consumption.

Circuit designs may be ported to an FPGA to verify operations thereof. Because one or more of the examples described herein may be implemented in an FPGA, a detailed description of such an IC is provided. However, it should be understood that other types of ICs may benefit from the technology described herein.

Programmable logic devices ("PLDs") are a well-known type of integrated circuit that can be programmed to perform specified logic functions. One type of PLD, the field programmable gate array ("FPGA"), typically includes an array of programmable tiles. These programmable tiles can include, for example, input/output blocks ("IOBs"), configurable logic blocks ("CLBs"), dedicated random access memory blocks ("BRAMs"), multipliers, digital signal processing blocks ("DSPs"), processors, clock managers, delay lock loops ("DLLs"), and so forth. As used herein, "include" and "including" mean including without limitation.

Each programmable tile typically includes both programmable interconnect and programmable logic. The programmable interconnect typically includes a large number of interconnect lines of varying lengths interconnected by programmable interconnect points ("PIPs"). The programmable logic implements the logic of a user design using programmable elements that can include, for example, function generators, registers, arithmetic logic, and so forth.

The programmable interconnect and programmable logic are typically programmed by loading a stream of configuration data into internal configuration memory cells that define how the programmable elements are configured. The configuration data can be read from memory (e.g., from an external PROM) or written into the FPGA by an external device. The collective states of the individual memory cells then determine the function of the FPGA.

Another type of PLD is the Complex Programmable Logic Device, or CPLD. A CPLD includes two or more "function blocks" connected together and to input/output ("I/O") resources by an interconnect switch matrix. Each function block of the CPLD includes a two-level AND/OR structure similar to those used in Programmable Logic Arrays ("PLAs") and Programmable Array Logic ("PAL") devices. In CPLDs, configuration data is typically stored on-chip in non-volatile memory. In some CPLDs, configuration data is stored on-chip in non-volatile memory, then downloaded to volatile memory as part of an initial configuration (programming) sequence.

For all of these programmable logic devices ("PLDs"), the functionality of the device is controlled by data bits provided to the device for that purpose. The data bits can be stored in volatile memory (e.g., static memory cells, as in FPGAs and some CPLDs), in non-volatile memory (e.g., FLASH memory, as in some CPLDs), or in any other type of memory cell.

Other PLDs are programmed by applying a processing layer, such as a metal layer, that programmably interconnects the various elements on the device. These PLDs are known as mask programmable devices. PLDs can also be implemented in other ways, e.g., using fuse or antifuse technology. The terms "PLD" and "programmable logic device" include but are not limited to these exemplary devices, as well as encompassing devices that are only partially programmable. For example, one type of PLD includes a combination of hard-coded transistor logic and a programmable switch fabric that programmably interconnects the hard-coded transistor logic.

Figure 7:
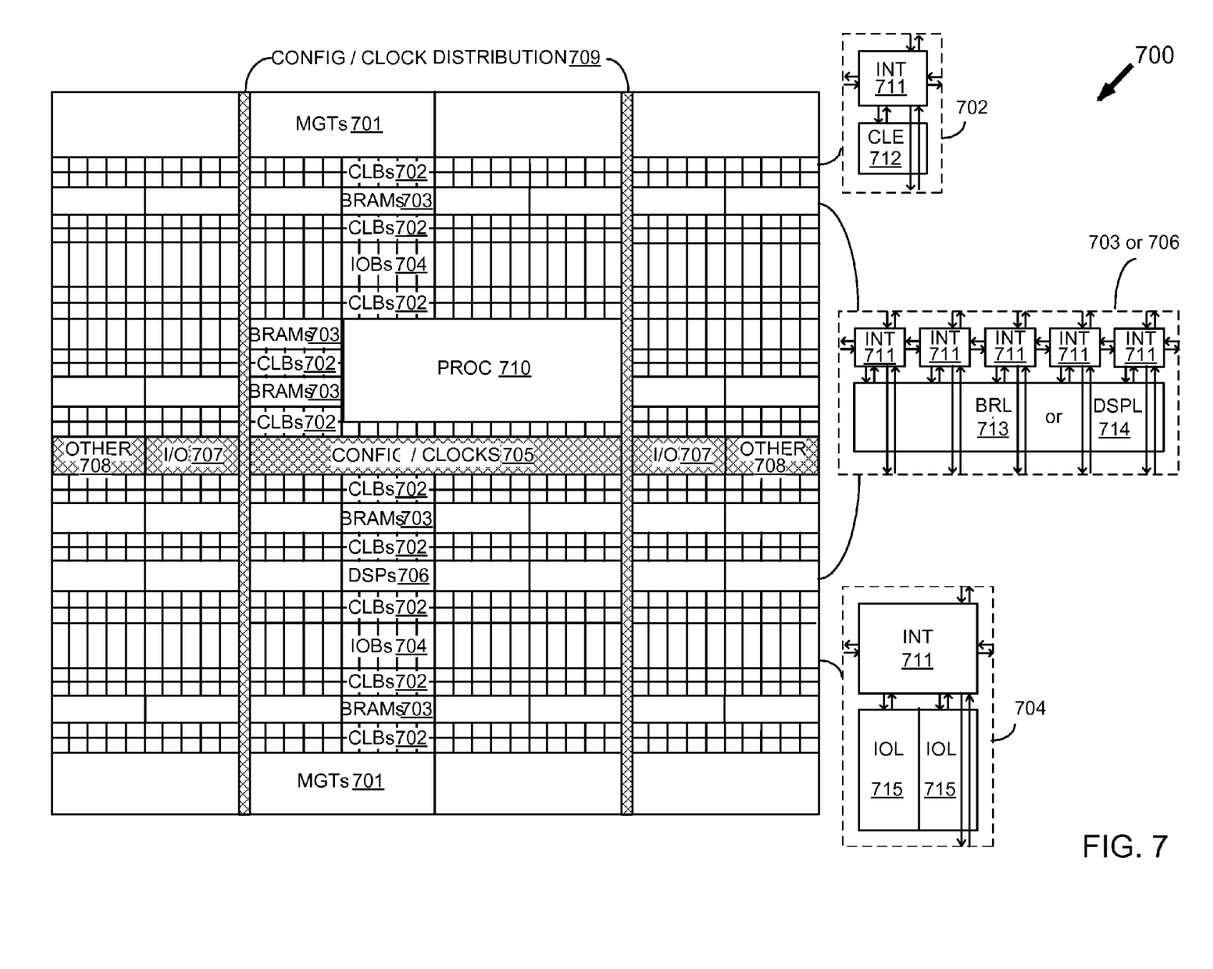
FIG. 7 is a simplified block diagram depicting an exemplary columnar Field Programmable Gate Array ("FPGA") architecture.

As noted above, advanced FPGAs can include several different types of programmable logic blocks in the array. For example, FIG. 7 illustrates an FPGA architecture 700 that includes a large number of different programmable tiles including multi-gigabit transceivers ("MGTs") 701, configurable logic blocks ("CLBs") 702, random access memory blocks ("BRAMs") 703, input/output blocks ("IOBs") 704, configuration and clocking logic ("CONFIG/CLOCKS") 705, digital signal processing blocks ("DSPs") 706, specialized input/output blocks ("I/O") 707 (e.g., configuration ports and clock ports), and other programmable logic 708 such as digital clock managers, analog-to-digital converters, system monitoring logic, and so forth. Some FPGAs also include dedicated processor blocks ("PROC") 710.

In some FPGAs, each programmable tile includes a programmable interconnect element ("INT") 711 having standardized connections to and from a corresponding interconnect element in each adjacent tile. Therefore, the programmable interconnect elements taken together implement the programmable interconnect structure for the illustrated FPGA. The programmable interconnect element 711 also includes the connections to and from the programmable logic element within the same tile, as shown by the examples included at the top of FIG. 7.

For example, a CLB 702 can include a configurable logic element ("CLE") 712 that can be programmed to implement user logic plus a single programmable interconnect element ("INT") 711. A BRAM 703 can include a BRAM logic element ("BRL") 713 in addition to one or more programmable interconnect elements. Typically, the number of interconnect elements included in a tile depends on the height of the tile. In the pictured embodiment, a BRAM tile has the same height as five CLBs, but other numbers (e.g., four) can also be used. A DSP tile 706 can include a DSP logic element ("DSPL") 714 in addition to an appropriate number of programmable interconnect elements. An 10B 704 can include, for example, two instances of an input/output logic element ("IOL") 715 in addition to one instance of the programmable interconnect element 711. As will be clear to those of skill in the art, the actual I/O pads connected, for example, to the I/O logic element 715 typically are not confined to the area of the input/output logic element 715.

In the pictured embodiment, a horizontal area near the center of the die (shown in FIG. 7) is used for configuration, clock, and other control logic. Vertical columns 709 extending from this horizontal area or column are used to distribute the clocks and configuration signals across the breadth of the FPGA.

Some FPGAs utilizing the architecture illustrated in FIG. 7 include additional logic blocks that disrupt the regular columnar structure making up a large part of the FPGA. The additional logic blocks can be programmable blocks and/or dedicated logic. For example, processor block 710 spans several columns of CLBs and BRAMs.

Note that FIG. 7 is intended to illustrate only an exemplary FPGA architecture. For example, the numbers of logic blocks in a row, the relative width of the rows, the number and order of rows, the types of logic blocks included in the rows, the relative sizes of the logic blocks, and the interconnect/logic implementations included at the top of FIG. 7 are purely exemplary. For example, in an actual FPGA more than one adjacent row of CLBs is typically included wherever the CLBs appear, to facilitate the efficient implementation of user logic, but the number of adjacent CLB rows varies with the overall size of the FPGA.

Figure 8:
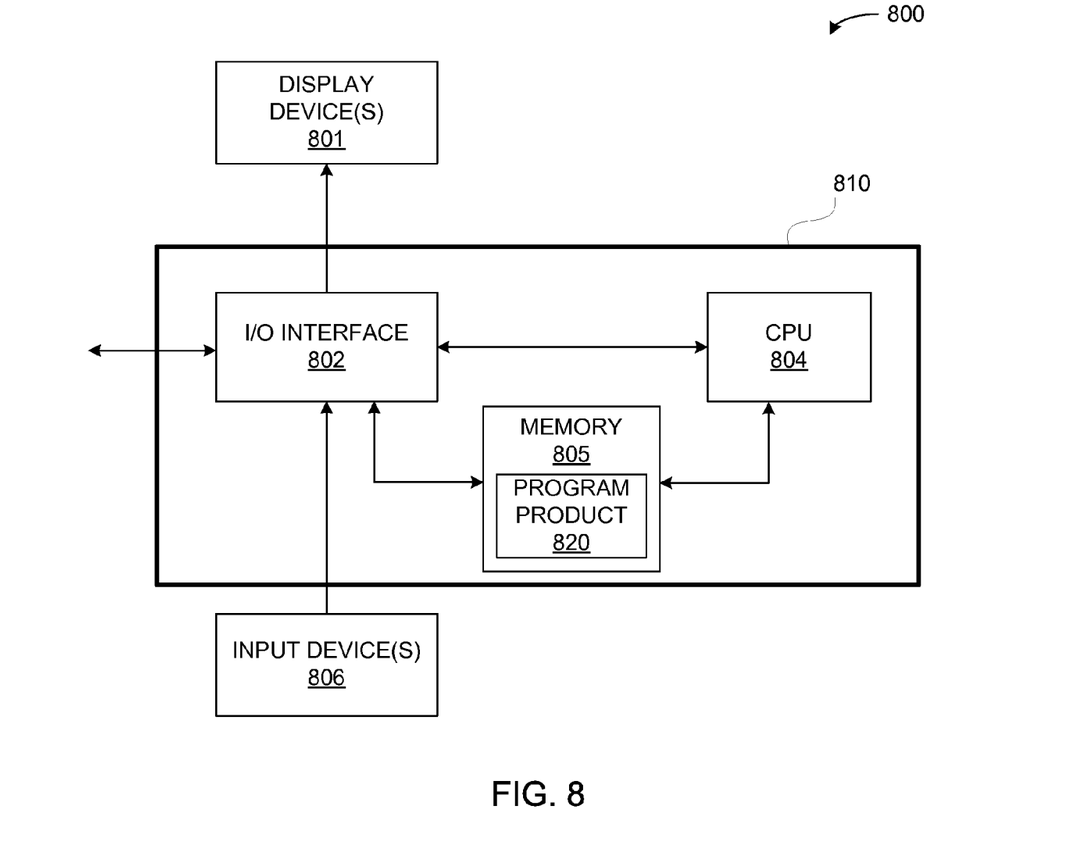
FIG. 8 is a block diagram depicting an exemplary computer system.

FIG. 8 is a block diagram depicting an exemplary computer system 800. Computer system 800 may include a programmed computer 810 coupled to one or more display devices 801, such as Cathode Ray Tube ("CRT") displays, plasma displays, Liquid Crystal Displays ("LCD"), projectors and to one or more input devices 806, such as a keyboard and a cursor pointing device. Other known configurations of a computer system may be used. Computer system 800 by itself or networked with one or more other computer systems 800 may provide an information handling system.

Programmed computer 810 may be programmed with a known operating system, which may be Mac OS, Java Virtual Machine, Real-Time OS Linux, Solaris, iOS, Android Linux-based OS, Unix, or a Windows operating system, among other known platforms. Programmed computer 810 includes a central processing unit (CPU) 804, memory 805, and an input/output ("I/O") interface 802. CPU 804 may be a type of microprocessor known in the art, such as available from IBM, Intel, ARM, and Advanced Micro Devices for example. Support circuits (not shown) may include cache, power supplies, clock circuits, data registers, and the like. Memory 805 may be directly coupled to CPU 804 or coupled through I/O interface 802. At least a portion of an operating system may be disposed in memory 805. Memory 805 may include one or more of the following: flash memory, random access memory, read only memory, magneto-resistive read/write memory, optical read/write memory, cache memory, magnetic read/write memory, and the like, as well as non-transitory signal-bearing media as described below.

I/O interface 802 may include chip set chips, graphics processors, and/or daughter cards, among other known circuits. An example of a daughter card may include a network interface card ("NIC"), a display interface card, a modem card, and a Universal Serial Bus ("USB") interface card, among other known circuits. Thus, I/O interface 802 may be coupled to a conventional keyboard, network, mouse, display printer, and interface circuitry adapted to receive and transmit data, such as data files and the like. Programmed computer 810 may be coupled to a number of client computers, server computers, or any combination thereof via a conventional network infrastructure, such as a company's Intranet and/or the Internet, for example, allowing distributed use for interface generation.

Memory 805 may store all or portions of one or more programs or data to implement processes in accordance with one or more embodiments hereof to provide program product 820. Additionally, those skilled in the art will appreciate that one or more embodiments hereof may be implemented in hardware, software, or a combination of hardware and software. Along those lines, program product 820 may be included in a CAD program, and computer system 800 may be programmed and/or configured with such a CAD program to provide an information handling system for the specific purpose of CAD. Such implementations may include a number of processors or processor cores independently executing various programs and dedicated hardware or programmable hardware.

One or more program(s) of program product 820, as well as documents thereof, may define functions of embodiments hereof and can be contained on a variety of non-transitory signal-bearing media, such as computer-readable media having code, which include, but are not limited to: (i) information permanently stored on non-writable storage media (e.g., read-only memory devices within a computer such as CD-ROM or DVD-ROM disks readable by a CD-ROM drive or a DVD drive); or (ii) alterable information stored on writable storage media (e.g., floppy disks within a diskette drive or flash drive or hard-disk drive or read/writable CD or read/writable DVD). The above embodiments specifically include information downloaded from the Internet and other networks. Such non-transitory signal-bearing media, when carrying computer-readable instructions that direct functions hereof, represent embodiments hereof.

While the foregoing describes exemplary apparatus(es) and/or method(s), other and further examples in accordance with the one or more aspects described herein may be devised without departing from the scope hereof, which is determined by the claims that follow and equivalents thereof. Claims listing steps do not imply any order of the steps. Trademarks are the property of their respective owners.

What is claimed is:

1. A method, comprising:
providing a first signal input and a second signal input to a first multiple clock domain object;
wherein the first signal input is for a first clock domain;
wherein the second signal input is for a second clock domain;
wherein the first clock domain is associated with a first frequency;
wherein the second clock domain is associated with a second frequency different from the first frequency;
converting the first signal input and the second signal input to a common multiple clock frequency;
obtaining a signal output from the first multiple clock domain object responsive to the common multiple clock frequency; and
estimating switching activity for the first multiple clock domain object for operation based on the common multiple clock frequency to generate a first switching activity estimate;
estimating switching activity for a second multiple clock domain object to generate a second switching activity estimate,
wherein the second multiple clock domain object follows the first multiple clock domain object in a propagation chain, and
wherein one of the first and second switching activity estimates is an overestimate and the other of the first and second switching activity estimates is an underestimate;
outputting an output estimate associated with the first and second switching activity estimates;
determining a circuit design based on the output estimate; and
programming a chip using the circuit design.

2. The method according to claim 1, further comprising:
estimating power consumption of the propagation chain based on the first and second switching activity estimates;
wherein the outputting is of the power consumption estimated.

3. The method according to claim 1, wherein the converting comprises:
obtaining a first toggle rate for the first frequency of the first signal input and a second toggle rate for the second frequency of the second signal input; and
normalizing the first toggle rate and the second toggle rate to the common multiple clock frequency.

4. The method according to claim 3, wherein the first toggle rate and the second toggle rate are respectively obtained from a first signal rate of the first signal input and a second signal rate of the second signal input as well as respectively from the first frequency and the second frequency.

5. The method according to claim 1,
wherein the common multiple clock frequency is a least common multiple frequency of the first frequency and the second frequency.

6. The method according to claim 5, further comprising
estimating power consumption of the propagation chain based on a combination of the first and second switching activity estimates.

7. The method according to claim 1, wherein the first clock domain and the second clock domain are reduced to a single common multiple clock domain responsive to the converting.

8. A method, comprising:
providing a first signal input and a second signal input to a first multiple clock domain block;
wherein the first signal input and the second signal input respectively have a first clock frequency and a second clock frequency;
first converting a first signal rate of the first signal input to a first toggle rate;
second converting a second signal rate of the second signal input to a second toggle rate;
normalizing the first toggle rate and the second toggle rate to a common multiple clock frequency of the first clock frequency and the second clock frequency;
propagating the first toggle rate and the second toggle rate through the first multiple clock domain block to provide a signal output;
estimating switching activity of the first multiple clock domain block in response to the propagating to provide the signal output to generate a first switching activity estimate;
estimating switching activity of a second multiple clock domain block following the first multiple clock domain block in a propagation chain to generate a second switching activity estimate;
determining a power consumption estimate based on the first and second switching activity estimates;
determining a circuit design based on the power consumption estimate; and
implementing the circuit design in a chip.

9. The method according to claim 8, wherein the propagating is a vectorless propagation.

10. The method according to claim 8, where the first converting and the second converting in combination with the normalizing convert the first multiple clock domain block to a single clock domain block.

11. The method according to claim 8, wherein the common multiple clock frequency is a least common multiple frequency of the first clock frequency and the second clock frequency.

12. The method according to claim 8, wherein the first toggle rate and the second toggle rate are respectively obtained from the first signal rate of the first signal input and the second signal rate of the second signal input as well as respectively from the first clock frequency and the second clock frequency.

13. The method according to claim 8, wherein:
the power consumption estimate based on the first and second switching activity estimates is an average.

14. The method according to claim 8, wherein:
the common multiple clock frequency is a first common multiple clock frequency; and
the signal output is a first signal output;

the method further comprising:
  providing the first signal output from the first multiple clock domain block as a third signal input to the second multiple clock domain block;
  wherein the providing of the first signal output as the third signal input comprises:
    converting the first signal output from a toggle-rate based normalized clock domain to a signal-rate based clock domain for the first common multiple clock frequency; and
    propagating the first signal output as the third signal input.

15. The method according to claim 14, further comprising:
  obtaining the third signal input and a fourth signal input provided to the second multiple clock domain block;
  wherein the third signal input and the fourth signal input respectively have a third clock frequency and a fourth clock frequency;
  wherein the third clock frequency is that of the first common multiple clock frequency;
  third converting a third signal rate of the third signal input to a third toggle rate;
  fourth converting a fourth signal rate of the fourth signal input to a fourth toggle rate;
  normalizing the third toggle rate and the fourth toggle rate to a second common multiple clock frequency of the third clock frequency and the fourth clock frequency;
  propagating the third toggle rate and the fourth toggle rate through the second multiple clock domain block to provide a second signal output;
  wherein the switching activity of the second multiple clock domain block is estimated in response to the propagating to provide the second signal output.

16. The method according to claim 15, wherein:
  the power consumption estimate is for operation of both of the first multiple clock domain block and the second multiple clock domain block.

17. A computer aided design program recorded in a non-transitory machine-readable recording medium which is capable of being processed by an information handling system for causing the information handling system to perform a method, the method comprising:
  providing first signal inputs to a first portion of a plurality of multiple clock domain blocks;
  wherein the first signal inputs respectively have clock frequencies different from one another;
  converting signal rates of the first signal inputs to corresponding toggle rates;
  normalizing the toggle rates to corresponding common multiple clock frequencies respectively associated with the first portion of the multiple clock domain blocks;
  propagating the toggle rates through the first portion of the multiple clock domain blocks corresponding thereto to provide signal outputs from the first portion of the multiple clock domain blocks;
  estimating switching activity of the first portion of the multiple clock domain blocks in response to the propagating to provide the signal outputs to generate a first switching activity estimate;
  estimating switching activity of a second portion of the multiple clock domain blocks to generate a second switching activity estimate,
  wherein one of the first and second switching activity estimates is an overestimate and the other of the first and second switching activity estimates is an underestimate;
  determining a power consumption estimate for the first and second switching activity estimates for the first and second portions of the multiple clock domain blocks;
  determining a circuit design based on the power consumption estimate;
  implementing the circuit design in a chip.

18. The computer aided design program according to claim 17, wherein the method further comprises providing the signal outputs as second signal inputs to the second portion of the multiple clock domain blocks.

19. The method of claim 1, wherein the overestimate is at least partially balanced by the underestimate during signal propagation.

20. The method of claim 8, wherein one of the first and second switching activity estimates is an overestimate and the other of the first and second switching activity estimates is an underestimate, and
  wherein the overestimate is at least partially balanced by the underestimate during signal propagation.

* * * * *